United States Patent
Tsodik et al.

(10) Patent No.: US 12,028,885 B2
(45) Date of Patent: *Jul. 2, 2024

(54) WIRELESS COMMUNICATION METHOD AND APPARATUS

(71) Applicant: HUAWEI TECHNOLOGIES CO., LTD., Guangdong (CN)

(72) Inventors: Genadiy Tsodik, Hod Hasharon (IL); Shimon Shilo, Hod Hasharon (IL); Doron Ezri, Hod Hasharon (IL); Oded Redlich, Hod Hasharon (IL); Wei Lin, Shenzhen (CN); Jun Luo, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 16 days.

This patent is subject to a terminal disclaimer.

(21) Appl. No.: 17/883,369

(22) Filed: Aug. 8, 2022

(65) Prior Publication Data
US 2022/0377745 A1  Nov. 24, 2022

Related U.S. Application Data

(63) Continuation of application No. 17/037,263, filed on Sep. 29, 2020, now Pat. No. 11,452,109, which is a
(Continued)

(51) Int. Cl.
*H04W 72/541* (2023.01)
*H04W 16/10* (2009.01)
(Continued)

(52) U.S. Cl.
CPC ......... *H04W 72/541* (2023.01); *H04W 16/14* (2013.01); *H04W 24/02* (2013.01);
(Continued)

(58) Field of Classification Search
None
See application file for complete search history.

(56) References Cited

U.S. PATENT DOCUMENTS 10,182,361 B1    1/2019 Moon et al.
10,798,717 B2 *  10/2020 Tsodik .................. H04W 24/02
(Continued)

FOREIGN PATENT DOCUMENTS

AU    2014260540 A1    11/2015
CN    103731858 A     4/2014
(Continued)

OTHER PUBLICATIONS

IEEE Std 802.11ac™-2013, Part 11: Wireless LAN Medium Access Control (MAC) and Physical Layer (PHY) Specifications Amendment 4: Enhancements for Very High Throughput for Operation in Bands below 6 GHz. 425 pages.
(Continued)

*Primary Examiner* — Faruk Hamza
*Assistant Examiner* — Cassandra L Decker
(74) *Attorney, Agent, or Firm* — WOMBLE BOND DICKINSON (US) LLP

(57) ABSTRACT

The method includes: receiving, by a second transmit end, policy information sent by a first transmit end, where the second transmit end belongs to a second BSS, the first transmit end is a transmit end that is in a first basis service set and that transmits data by using a first link, and the policy information is used to indicate a condition that the second transmit end needs to satisfy to transmit data by using a second link, or used to indicate whether the second transmit end is allowed to transmit data by using a second link; and determining, by the second transmit end based on the policy information, whether to transmit data by using the second link. According to the wireless communication method, a
(Continued)

spatial reuse transmission policy can be adjusted dynamically based on an actual situation of a current network. This improves a system throughput.

20 Claims, 5 Drawing Sheets

Related U.S. Application Data continuation of application No. 16/030,644, filed on Jul. 9, 2018, now Pat. No. 10,798,717, which is a continuation of application No. PCT/CN2016/070594, filed on Jan. 11, 2016.

(51) Int. Cl.
  *H04W 16/14* (2009.01)
  *H04W 24/02* (2009.01)
  *H04W 72/0446* (2023.01)
  *H04W 72/53* (2023.01)
  *H04W 74/00* (2009.01)
  *H04W 74/0808* (2024.01)
  *H04W 76/10* (2018.01)
  *H04W 76/15* (2018.01)
  *H04W 84/12* (2009.01)

(52) U.S. Cl.
  CPC ....... *H04W 72/0446* (2013.01); *H04W 72/53* (2023.01); *H04W 74/0808* (2013.01); *H04W 76/10* (2018.02); *H04W 76/15* (2018.02); *H04W 16/10* (2013.01); *H04W 74/00* (2013.01); *H04W 84/12* (2013.01)

(56) References Cited

U.S. PATENT DOCUMENTS

| | | | | |
|---|---|---|---|---|
| 11,452,109 | B2* | 9/2022 | Tsodik | H04W 72/53 |
| 2008/0171565 | A1* | 7/2008 | Shan | H04W 16/14 |
| | | | | 455/501 |
| 2009/0163215 | A1* | 6/2009 | Abedi | H04W 16/14 |
| | | | | 455/446 |
| 2013/0102319 | A1* | 4/2013 | Yamazaki | H04W 52/243 |
| | | | | 455/450 |
| 2013/0201866 | A1 | 8/2013 | Wentink et al. | |
| 2014/0112175 | A1 | 4/2014 | Pantelidou et al. | |
| 2014/0328270 | A1 | 11/2014 | Zhu et al. | |
| 2015/0282043 | A1 | 10/2015 | Fang et al. | |
| 2015/0358904 | A1 | 12/2015 | Kwon et al. | |
| 2015/0382360 | A1 | 12/2015 | Huang et al. | |
| 2016/0081010 | A1 | 3/2016 | Seok | |
| 2016/0150534 | A1* | 5/2016 | Kwon | H04W 72/0446 |
| | | | | 370/338 |
| 2016/0165549 | A1 | 6/2016 | Zhang et al. | |
| 2016/0233940 | A1 | 8/2016 | Huang et al. | |
| 2017/0064644 | A1 | 3/2017 | Cariou et al. | |
| 2017/0064741 | A1 | 3/2017 | Zhou et al. | |
| 2017/0070962 | A1 | 3/2017 | Wang et al. | |
| 2017/0086226 | A1 | 3/2017 | Wang | |
| 2017/0127448 | A1* | 5/2017 | Zhou | H04W 28/04 |
| 2018/0139637 | A1 | 5/2018 | Dong | |
| 2018/0242331 | A1 | 8/2018 | Zhu et al. | |

FOREIGN PATENT DOCUMENTS

| | | | |
|---|---|---|---|
| CN | 103765975 | A | 4/2014 |
| CN | 104954297 | A | 9/2015 |
| CN | 105101347 | A | 11/2015 |
| CN | 105101432 | A | 11/2015 |
| CN | 105101453 | A | 11/2015 |
| EP | 3007493 | A1 | 4/2016 |
| WO | 2015013923 | A1 | 2/2015 |
| WO | 2015038930 | A1 | 3/2015 |

OTHER PUBLICATIONS

IEEE Std 802.11g-2003, Part 11: Wireless LAN Medium Access Control (MAC) and Physical Layer (PHY) specifications Amendment 4: Further Higher Data Rate Extension in the 2.4 GHz Band. Jun. 12, 2003, 77 pages.

IEEE Std 802.11n-2009, Part 11: Wireless LAN Medium Access Control (MAC) and Physical Layer (PHY) specifications Amendment 5: Enhancements for higher Throughput. Oct. 29, 2009, 536 pages.

IEEE P802.11ax™/D3.0, Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Enhancements for High Efficiency WLAN. Jun. 2018, 682 pages.

* cited by examiner

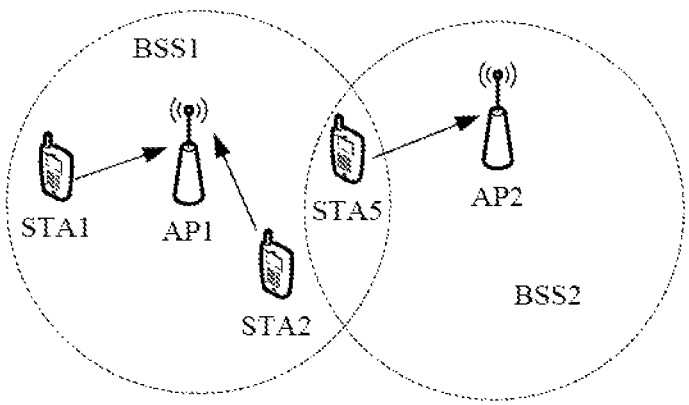

A second transmit end receives policy information sent by a first transmit end, where the second transmit end belongs to a second BSS, the first transmit end is a transmit end that is in a first BSS and that transmits data by using a first link, the policy information is used to indicate a condition that the second transmit end needs to satisfy to transmit data by using a second link, or used to indicate whether the second transmit end is allowed to transmit data by using a second link, time domain resources corresponding to the second link are partially the same as time domain resources corresponding to the first link, and frequency domain resources corresponding to the second link are partially or completely the same as frequency domain resources corresponding to the first link — S210

The second transmit end determines, based on the policy information, whether to transmit data by using the second link — S220

FIG. 2

WIRELESS COMMUNICATION METHOD AND APPARATUS

CROSS-REFERENCE TO RELATED APPLICATIONS

This application is a continuation of U.S. patent application Ser. No. 17/037,263, filed on Sep. 29, 2020, which is a continuation of U.S. patent application Ser. No. 16/030,644, filed on Jul. 9, 2018, now U.S. Pat. No. 10,798,717. which is a continuation of International Application No. PCT/CN2016/070594, filed on Jan. 11, 2016. All of the aforementioned patent applications are hereby incorporated by reference in their entireties.

TECHNICAL FIELD

The present invention relates to the communications field, and more specifically, to a wireless communication method and apparatus.

BACKGROUND

As communications technologies develop, to improve a system throughput in a dense scenario, the concept of spatial reuse (SR) is introduced into some networks such as a wireless local area network (WLAN). In a particular scenario or condition, two or more stations (STA) are allowed to use a same time-frequency resource (that is, use a same channel within a same time period) for transmission. For example, as shown in FIG. 1, at the same time when a STA1 and a STA2 send uplink data to an access point (AP) 1 (hereinafter, a link between the AP1 and the STA1 and a link between the AP1 and the STA2 are collectively referred to as a first link), a STA5 uses some or all of time-frequency resources of the first link to perform data transmission with an AP2 (hereinafter, a link between the AP2 and the STA5 is referred to as a second link). The second link occupies the some or all of time-frequency resources of the first link during wireless communication, and therefore, it cannot be ensured that only one STA sends data in a channel within a time period. Consequently, interference is caused between links when spatial reuse is used, affecting transmission quality.

In the prior art, a clear channel assessment (CCA) mechanism is used to perform spatial reuse transmission. An input signal threshold is predefined to determine whether spatial reuse transmission can be performed. The input signal threshold is not based on an existing network structure, and cannot be adjusted correspondingly based on an interference status change in a network.

Therefore, a technology for dynamically performing spatial reuse transmission based on an actual interference status is desired.

SUMMARY

In view of this, embodiments of the present invention provide a wireless communication method, apparatus, system, and device, and a computer readable medium, so as to dynamically adjust a spatial reuse transmission policy based on an actual situation of a current network. This improves a system throughput.

According to a first aspect, a wireless communication method is provided, where the method is applied to a wireless local area network, the wireless local area network includes a first basic service set (BSS) and a second BSS, and a coverage area of the first BSS partially overlaps with a coverage area of the second BSS; and the method includes: receiving, by a second transmit end, policy information sent by a first transmit end, where the second transmit end belongs to the second BSS, the first transmit end is a transmit end that is in the first BSS and that transmits data by using a first link, the policy information is used to indicate a condition that the second transmit end needs to satisfy to transmit data by using a second link, or used to indicate whether the second transmit end is allowed to transmit data by using a second link, time domain resources corresponding to the second link are partially the same as time domain resources corresponding to the first link, and frequency domain resources corresponding to the second link are partially or completely the same as frequency domain resources corresponding to the first link; and determining, by the second transmit end based on the policy information, whether to transmit data by using the second link.

With reference to the first aspect, in a first possible implementation of the first aspect, the policy information includes adjustment value indication information for a CCA threshold used by the second transmit end. Therefore, the second transmit end can adjust the CCA threshold correspondingly based on an interference status change in a network. This improves transmission efficiency.

With reference to the first aspect or the foregoing possible implementation, in a second possible implementation of the first aspect, the policy information includes indication information of a maximum allowed interference value, where the maximum allowed interference value is a maximum interference value that is of an interference signal and that is allowed by a first receive end, and the first receive end is a receive end of the first link. Therefore, the second transmit end can determine, based on the maximum interference value that is of a signal from the second BSS and that is allowed by the first receive end, a condition that needs to be satisfied for performing spatial reuse transmission, so as to flexibly determine a spatial reuse transmission policy based on an actual network case.

With reference to the first aspect or the foregoing possible implementation, in a third possible implementation of the first aspect, the method includes: determining, by the second transmit end, a maximum energy value of an interference signal, where the interference signal is a signal from the first BSS that is received by the second transmit end; and the determining, by the second transmit end based on the policy information, whether to transmit data by using the second link includes: determining, by the second transmit end based on a value relationship between the maximum allowed interference value and the maximum energy value of the interference signal, whether to transmit data by using the second link. In this way, the second transmit end can determine, based on the maximum allowed interference value and a maximum value of interference of a current signal from the first BSS on the second transmit end, whether to perform spatial reuse transmission.

With reference to the first aspect or the foregoing possible implementations, in a fourth possible implementation of the first aspect, the policy information further includes first indication information and second indication information, the first indication information is used to indicate that the first link is a downlink transmission link, and the second indication information is used to indicate whether the second transmit end is allowed to transmit data by using the second link; and the determining, by the second transmit end based on the policy information, whether to transmit data by using the second link includes: determining, by the second transmit end based on the first indication information and the second indication information, whether to transmit data by using the second link. This can reduce interference on the first link and improve robustness of spatial reuse transmission.

With reference to the first aspect or the foregoing possible implementations, in a fifth possible implementation of the first aspect, the policy information is carried in a data packet transmitted by using the first link, so that the policy information can be transmitted in an existing data packet. This saves transmission resources, and improves network transmission efficiency.

According to a second aspect, a wireless communication method is provided, where the method is applied to a wireless local area network, the wireless local area network includes a first BSS and a second BSS, and a coverage area of the first BSS partially overlaps with a coverage area of the second BSS; and the method includes: determining, by a first transmit end, policy information, where the first transmit end is a transmit end that is in the first BSS and that transmits data by using a first link, the policy information is used to indicate a condition that a second transmit end needs to satisfy to transmit data by using a second link, or used to indicate whether the second transmit end is allowed to transmit data by using a second link, the second transmit end belongs to the second BSS, time domain resources corresponding to the second link are partially the same as time domain resources corresponding to the first link, and frequency domain resources corresponding to the second link are partially or completely the same as frequency domain resources corresponding to the first link; and sending, by the first transmit end, the policy information.

With reference to the second aspect, in a first possible implementation of the second aspect, the policy information includes adjustment value indication information for a CCA threshold used by the second transmit end; and the determining, by a first transmit end, policy information includes: receiving, by the first transmit end, the adjustment value indication information sent by a receive end of the first link; and determining, by the first transmit end, the adjustment value indication information as the policy information. In this way, the second transmit end can adjust the CCA threshold correspondingly based on an interference status change in a network. This improves transmission efficiency.

With reference to the second aspect or the foregoing possible implementation, in a second possible implementation of the second aspect, the policy information includes indication information of a maximum allowed interference value and a cell identifier of the second BSS, where the maximum allowed interference value is a maximum interference value that is of a signal from the second BSS and that is allowed by the receive end of the first link. Therefore, the second transmit end can determine, based on the maximum allowed interference value, a condition that needs to be satisfied for performing spatial reuse transmission, so as to flexibly determine a spatial reuse transmission policy based on an actual network case.

With reference to the second aspect or the foregoing possible implementations, in a third possible implementation of the second aspect, the method includes: receiving, by the first transmit end, maximum interference value information, where the maximum interference value information is used to indicate a maximum energy value of an interference signal from the second BSS that is received by the receive end of the first link; and the determining, by a first transmit end, policy information includes: determining, by the first transmit end, second indication information based on a value relationship between the maximum energy value of the interference signal and the maximum allowed interference value, where the second indication information is used to indicate whether the second transmit end is allowed to transmit data by using the second link, and the maximum allowed interference value is a maximum interference value that is of an interference signal and that is allowed by the receive end of the first link. In this way, a spatial reuse transmission policy can be flexibly determined based on an actual network case.

With reference to the second aspect or the foregoing possible implementation, in a fourth possible implementation of the second aspect, the policy information further includes first indication information, where the first indication information is used to indicate that the first link is a downlink transmission link, so that the second transmit end determines, based on the first indication information and the second indication information, whether to transmit data by using the second link.

With reference to the second aspect or the foregoing possible implementations, in a fifth possible implementation of the second aspect, the method includes: determining, by the first transmit end, the maximum allowed interference value of the receive end of the first link based on an energy value of an input signal of the receive end of the first link and a lowest signal-to-noise ratio required for transmitting information by using the first link, where the input signal is a signal of the first transmit end that is received by the receive end of the first link.

With reference to the second aspect or the foregoing possible implementation, in a sixth possible implementation of the second aspect, the first transmit end further determines the maximum allowed interference value of the receive end of the first link based on a margin, where the margin is used to improve robustness of spatial reuse transmission.

With reference to the second aspect or the foregoing possible implementations, in a seventh possible implementation of the second aspect, the first transmit end further determines the maximum allowed interference value of the receive end of the first link based on a depth gap value, where the depth gap value is a difference between a first interference value and a second interference value, the first interference value is an energy value of a signal from the second BSS that is received by the receive end of the first link, and the second interference value is an energy value of a signal from the second BSS that is received by a device, in the first BSS, nearest to the second BSS. In this way, when the first transmit end is unclear of a specific location of a device in the second BSS, the transmit end in the first BSS can obtain the maximum allowed interference value of the receive end of the first link based on an actual interference status.

With reference to the second aspect or the foregoing possible implementations, in an eighth possible implementation of the second aspect, the policy information is carried in a data packet transmitted by using the first link, so that the policy information can be transmitted in an existing data packet. This saves transmission resources, and improves network transmission efficiency.

According to a third aspect, a wireless communication method is provided, where the method is applied to a wireless local area network, the wireless local area network includes a first BSS and a second BSS, and a coverage area of the first BSS partially overlaps with a coverage area of the second BSS; and the method includes: determining, by a first receive end, policy information, where the first receive end is a receive end that is in the first BSS and that transmits data by using a first link, the policy information is used to indicate a condition that the second transmit end needs to satisfy to transmit data by using a second link, the second transmit end belongs to the second BSS, time domain resources corresponding to the second link are partially the same as time domain resources corresponding to the first link, and frequency domain resources corresponding to the second link are partially or completely the same as frequency domain resources corresponding to the first link; and sending, by the first receive end, the policy information to a first transmit end, where the first transmit end is a transmit end of the first link.

With reference to the third aspect, in a first possible implementation of the third aspect, the policy information includes adjustment value indication information for a CCA threshold used by the second transmit end. Therefore, the second transmit end can adjust the CCA threshold correspondingly based on an interference status change in a network. This improves transmission efficiency.

With reference to the third aspect or the foregoing possible implementation, in a second possible implementation of the third aspect, the policy information is carried in a data packet transmitted by using the first link, so that the policy information can be transmitted in an existing data packet. This improves network transmission efficiency.

According to a fourth aspect, a wireless communications apparatus is provided, where the apparatus is configured in a wireless local area network, the wireless local area network includes a first BSS and a second BSS, and a coverage area of the first BSS partially overlaps with a coverage area of the second BSS; and the apparatus includes: a receiving module, configured to receive policy information sent by a first transmit end, where the first transmit end is a transmit end that is in the first BSS and that transmits data by using a first link, the policy information is used to indicate a condition that a second transmit end needs to satisfy to transmit data by using a second link, or used to indicate whether the second transmit end is allowed to transmit data by using a second link, the second transmit end belongs to the second BSS, time domain resources corresponding to the second link are partially the same as time domain resources corresponding to the first link, and frequency domain resources corresponding to the second link are partially or completely the same as frequency domain resources corresponding to the first link; and a determining module, configured to determine, based on the policy information received by the receiving module, whether to transmit data by using the second link.

With reference to the fourth aspect, in a first possible implementation of the fourth aspect, the policy information includes adjustment value indication information for a CCA threshold used by the second transmit end. Therefore, the second transmit end can adjust the CCA threshold correspondingly based on an interference status change in a network. This improves transmission efficiency.

With reference to the fourth aspect or the foregoing possible implementation, in a second possible implementation of the fourth aspect, the policy information includes indication information of a maximum allowed interference value and a cell identifier of the second BSS, where the maximum allowed interference value is a maximum interference value that is of a signal from the second BSS and that is allowed by a first receive end, and the first receive end is a receive end of the first link. Therefore, the second transmit end can determine, based on the maximum interference value that is of the signal from the second BSS and that is allowed by the first receive end, a condition that needs to be satisfied for performing spatial reuse transmission.

With reference to the fourth aspect or the foregoing possible implementation, in a third possible implementation of the fourth aspect, the determining module includes: a first determining unit, configured to determine a maximum energy value of an interference signal, where the interference signal is a signal from the first BSS that is received by the second transmit end; and a second determining unit, configured to determine, based on a value relationship between the maximum allowed interference value and the maximum energy value of the interference signal, whether to transmit data by using the second link. In this way, the second transmit end can determine, based on the maximum allowed interference value and a maximum value of interference of the signal from the first BSS on the second transmit end, the condition that needs to be satisfied for performing spatial reuse transmission.

With reference to the fourth aspect or the foregoing possible implementations, in a fourth possible implementation of the fourth aspect, the policy information includes first indication information and second indication information, the first indication information is used to indicate that the first link is a downlink transmission link, and the second indication information is used to indicate whether the second transmit end is allowed to transmit data by using the second link; and the determining module is configured to determine, based on the first indication information and the second indication information, whether to transmit data by using the second link. This can improve network transmission efficiency.

With reference to the fourth aspect or the foregoing possible implementations, in a fifth possible implementation of the fourth aspect, the policy information is carried in a data packet transmitted by using the first link, so that the policy information can be transmitted in an existing data packet. This saves transmission resources, and improves network transmission efficiency.

According to a fifth aspect, a wireless communications apparatus is provided, where the apparatus is configured in a wireless local area network, the wireless local area network includes a first BSS and a second BSS, and a coverage area of the first BSS partially overlaps with a coverage area of the second BSS; and the apparatus includes: a determining module, configured to determine policy information, where the apparatus is a transmit apparatus that is in the first BSS and that transmits data by using a first link, the policy information is used to indicate a condition that a second transmit end needs to satisfy to transmit data by using a second link, or used to indicate whether the second transmit end is allowed to transmit data by using a second link, the second transmit end belongs to the second BSS, time domain resources corresponding to the second link are partially the same as time domain resources corresponding to the first link, and frequency domain resources corresponding to the second link are partially or completely the same as frequency domain resources corresponding to the first link; and a sending module, configured to send the policy information determined by the determining module.

With reference to the fifth aspect, in a first possible implementation of the fifth aspect, the apparatus includes a first receiving module, configured to receive adjustment value indication information for a CCA threshold used by the second transmit end that is sent by a receive end of the first link; and the determining module is configured to determine the adjustment value indication information as the policy information. In this way, the second transmit end can adjust the CCA threshold correspondingly based on an interference status change in a network. This improves transmission efficiency.

With reference to the fifth aspect or the foregoing possible implementation, in a second possible implementation of the fifth aspect, the policy information includes indication information of a maximum allowed interference value and a cell identifier of the second BSS, where the maximum allowed interference value is a maximum interference value that is of a signal from the second BSS and that is allowed by the receive end of the first link. Therefore, the second transmit end can determine, based on the maximum allowed interference value, a condition that needs to be satisfied for performing spatial reuse transmission.

With reference to the fifth aspect or the foregoing possible implementations, in a third possible implementation of the fifth aspect, the apparatus includes: a second receiving module, configured to receive maximum interference value information, where the maximum interference value information is used to indicate a maximum energy value of an interference signal from the second BSS that is received by the receive end of the first link; and the determining module is configured to determine second indication information based on a value relationship between the maximum energy value of the interference signal and the maximum allowed interference value, where the second indication information is used to indicate whether the second transmit end is allowed to transmit data by using the second link, and the maximum allowed interference value is a maximum interference value that is of the signal from the second BSS and that is allowed by the receive end of the first link. In this way, the second transmit end can determine whether to perform spatial reuse transmission based on the second indication information.

With reference to the fifth aspect or the foregoing possible implementation, in a fourth possible implementation of the fifth aspect, the policy information further includes first indication information, where the first indication information is used to indicate that the first link is a downlink transmission link, so that the second transmit end determines, based on the first indication information and the second indication information, whether to transmit data by using the second link.

With reference to the fifth aspect or the foregoing possible implementations, in a fifth possible implementation of the fifth aspect, the determining module is configured to determine the maximum allowed interference value based on an energy value of an input signal of the receive end of the first link and a lowest signal-to-noise ratio required for transmitting information by using the first link, where the input signal is a signal of a transmit end of the first link that is received by the receive end of the first link.

With reference to the fifth aspect or the foregoing possible implementation, in a sixth possible implementation of the fifth aspect, the determining module is further configured to determine the maximum allowed interference value based on a margin, where the margin is used to improve robustness of spatial reuse transmission.

With reference to the fifth aspect or the foregoing possible implementations, in a seventh possible implementation of the fifth aspect, the determining module is further configured to determine the maximum allowed interference value of the receive end of the first link based on a depth gap value, where the depth gap value is a difference between a first interference value and a second interference value, the first interference value is an energy value of a signal from the second BSS that is received by the receive end of the first link, and the second interference value is an energy value of a signal from the second BSS that is received by a device, in the first BSS, nearest to the second BSS. In this way, when the transmit end of the first link is unclear of a specific location of a device in the second BSS, the transmit end of the first link can obtain the maximum allowed interference value of the receive end of the first link based on an actual interference status.

With reference to the fifth aspect or the foregoing possible implementations, in an eighth possible implementation of the fifth aspect, the policy information is carried in a data packet transmitted by using the first link, so that the policy information can be transmitted in an existing data packet. This saves transmission resources, and improves network transmission efficiency.

According to a sixth aspect, a wireless communications apparatus is provided, where the apparatus is configured in a wireless local area network, the wireless local area network includes a first BSS and a second BSS, and a coverage area of the first BSS partially overlaps with a coverage area of the second BSS; and the apparatus includes: a determining module, configured to determine policy information, where the apparatus is a receive apparatus that is in the first BSS and that transmits data by using a first link, the policy information is used to indicate a condition that a second transmit end needs to satisfy to transmit data by using a second link, the second transmit end belongs to the second BSS, time domain resources corresponding to the second link are partially the same as time domain resources corresponding to the first link, and frequency domain resources corresponding to the second link are partially or completely the same as frequency domain resources corresponding to the first link; and a sending module, configured to send the policy information determined by the determining module to a first transmit end, where the first transmit end is a transmit end of the first link.

With reference to the sixth aspect, in a first possible implementation of the sixth aspect, the policy information includes adjustment value indication information for a CCA threshold used by the second transmit end. Therefore, the second transmit end can adjust the CCA threshold correspondingly based on an interference status change in a network. This improves transmission efficiency.

With reference to the sixth aspect or the foregoing possible implementation, in a second possible implementation of the sixth aspect, the policy information is carried in a data packet transmitted by using the first link, so that the policy information can be transmitted in an existing data packet. This improves network transmission efficiency.

According to a seventh aspect, a wireless communications system is provided, where each access point AP in the wireless communications system has a different cell identifier, and each station STA can identify a cell identifier in a currently transmitted signal; the wireless communications system includes a first BSS and a second BSS; a coverage area of the first BSS partially overlaps with a coverage area of the second BSS; each AP or STA in the wireless communications system can obtain an interference status of a neighboring cell signal; an AP and a STA associated with the AP exchange respective interference status information detected by the AP and the STA; information transmitted in the wireless communications system for determining whether to perform spatial reuse transmission can be included in any data packet that is sent out; and when the communications system transmits data, the method according to any one of the first aspect to the third aspect or the possible implementations of the foregoing three aspects can be applied to the communications system.

According to an eighth aspect, a wireless communications device is provided, where the device is applied to a wireless local area network, the wireless local area network includes a first BSS and a second BSS, and a coverage area of the first BSS partially overlaps with a coverage area of the second BSS; and the device includes a processor, a memory, a bus system, and a transceiver. The processor, the memory, and the transmitter are connected by using the bus system; the memory is configured to store an instruction; the processor is configured to execute the instruction stored in the memory, to control the transmitter to receive a signal or send a signal; and when the processor executes the instruction stored in the memory, the execution enables the processor to execute the method according to any one of the first aspect or the possible implementations of the first aspect.

According to a ninth aspect, a wireless communications device is provided, where the device is applied to a wireless local area network, the wireless local area network includes a first BSS and a second BSS, and a coverage area of the first BSS partially overlaps with a coverage area of the second BSS; and the device includes a processor, a memory, a bus system, and a transceiver. The processor, the memory, and the transmitter are connected by using the bus system; the memory is configured to store an instruction; the processor is configured to execute the instruction stored in the memory, to control the transmitter to receive a signal or send a signal; and when the processor executes the instruction stored in the memory, the execution enables the processor to execute the method according to any one of the second aspect or the possible implementations of the second aspect.

According to a tenth aspect, a wireless communications device is provided, where the device is applied to a wireless local area network, the wireless local area network includes a first BSS and a second BSS, and a coverage area of the first BSS partially overlaps with a coverage area of the second BSS; and the device includes a processor, a memory, a bus system, and a transceiver. The processor, the memory, and the transmitter are connected by using the bus system; the memory is configured to store an instruction; the processor is configured to execute the instruction stored in the memory, to control the transmitter to receive a signal or send a signal; and when the processor executes the instruction stored in the memory, the execution enables the processor to execute the method according to any one of the third aspect or the possible implementations of the third aspect.

According to an eleventh aspect, a computer readable medium is provided, and is configured to store a computer program. The computer program includes an instruction used to execute the method according to any one of the first aspect to the third aspect or the possible implementation of the foregoing three aspects.

Based on the foregoing technical solutions, the wireless communication method, apparatus, system, and device and the computer readable medium in the embodiments of the present invention can dynamically adjust a spatial reuse transmission policy based on an actual situation of a current network. This improves a system throughput.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic diagram of a communications system to which a wireless communication method in an embodiment of the present invention is applicable;

FIG. 2 is a schematic flowchart of a wireless communication method according to an embodiment of the present invention;

DESCRIPTION OF EMBODIMENTS

Figure 3:
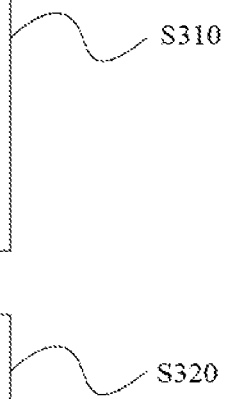
FIG. 3 is a schematic flowchart of a wireless communication method according to another embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions in the present invention may be applied to various data transmission communications systems including a first link and a second link, such as a wireless local area network system and a Wireless Fidelity (Wi-Fi) system represented by 802.11a, 802.11b, 802.11g, 802.11n, and 802.11ac, or may be applied to a next-generation Wi-Fi system, a next-generation wireless local area network system, or the like.

Correspondingly, a transmit end or a receive end may be a STA in a WLAN. The STA may alternatively be referred to as a subscriber unit, an access terminal, a mobile station, a remote station, a remote terminal, a mobile device, a user terminal, a terminal, a wireless communications device, a user agent, a user apparatus, or user equipment. The STA may be a cellular phone, a cordless phone, a session initiation protocol (SIP) phone, a wireless local loop (WLL) station, a personal digital assistant (PDA), a handheld device with a wireless local area network (such as Wi-Fi) communication function, a computing device, or another processing device connected to a wireless modem.

In addition, the transmit end or the receive end may alternatively be an access point (AP) in a WLAN. The AP may be configured to communicate with a STA by using a wireless local area network, and transmit data of the STA to a network side, or transmit, to the STA, data from the network side.

The following describes, by way of example and not by way of limitation, an execution process and actions performed in a WLAN system in a data transmission method and by a data transmission apparatus in the present invention FIG. 1 is a schematic diagram of an application scenario according to an embodiment of the present invention. As shown in FIG. 1, at the same time when a STA1 and a STA2 send uplink data to an access point AP1, a STA5 uses some or all of time-frequency resources of a first link to perform data transmission with an access point AP2. Orthogonal frequency division multiple access (OFDMA) is introduced into the Institute of Electrical and Electronics Engineers (IEEE) 802.11ax specification. When the first link is a downlink, receive stations may be a plurality of stations in a basic service set (BSS) of the first link. Locations of the plurality of stations are unknown to a station of a second link, and if some stations are relatively near to the station of the second link, mutual interference between the links increases. To avoid affecting transmission quality of the first link, interference of the second link on the receive station of the first link cannot exceed maximum interference that the first link can tolerate.

It should be understood that when the first link is an uplink, regardless of a quantity of stations scheduled by the AP1 in this case, the receive station can only be the AP1, and the second link may interfere with the AP1 only. Therefore, spatial reuse transmission is more suitable to this scenario. However, the wireless communication method in the embodiment of the present invention is also applicable to the scenario in which the first link is a downlink.

In addition, in this embodiment of the present invention, the second link may be an uplink, or may be a downlink. To be specific, both an access point of the second link and a station of the second link may use the second link to transmit data.

It should be understood that the application scenario in FIG. 1 is used as only an example to describe this embodiment of the present invention, but this embodiment of the present invention is not limited thereto. For example, a basic service set BSS2 to which the AP2 belongs may include more stations, and the BSS1 may alternatively include only one station. For another example, the communications system may include more BSSs in addition to the BSS1 and the BSS2. For still another example, a spatial reuse link is not only used for uplink transmission, but also used for downlink transmission.

In the prior art, a channel between two communications nodes is referred to as a link. In this embodiment of the present invention, there may be one or more first links, and correspondingly, there may be one or more second links.

Figure 4:
FIG. 4 is a schematic flowchart of a wireless communication method according to still another embodiment of the present invention.

The following describes in detail a wireless communication method according to an embodiment of the present invention with reference to FIG. 2 to FIG. 4 by using a case that the first link is a downlink as an example not a limitation.

In the following embodiment, each AP or STA can identify a BSS to which a currently transmitted signal belongs, that is, can identify a cell identifier carried in the signal, and can obtain an interference status of a neighboring cell. A STA and an AP in a same BSS can exchange respective interference status information detected by the STA and the AP.

FIG. 2 is a schematic flowchart of a wireless communication method 200 according to an embodiment of the present invention from the perspective of a second transmit end, to be specific, from the perspective of a transmit end of a second link. As shown in FIG. 2, the method 200 includes the following operations.

S210. The second transmit end receives policy information sent by a first transmit end, where the second transmit end belongs to a second BSS, the first transmit end is a transmit end that is in a first BSS and that transmits data by using a first link, the policy information is used to indicate a condition that the second transmit end needs to satisfy to transmit data by using the second link, or used to indicate whether the second transmit end is allowed to transmit data by using the second link, time domain resources corresponding to the second link are partially the same as time domain resources corresponding to the first link, and frequency domain resources corresponding to the second link are partially or completely the same as frequency domain resources corresponding to the first link.

S220. The second transmit end determines, based on the policy information, whether to transmit data by using the second link.

According to the wireless communication method in this embodiment of the present invention, a spatial reuse transmission policy can be adjusted dynamically based on an actual situation of a current network. This improves a system throughput.

In S210, the second transmit end may be an AP or may be a STA; the policy information received by the second transmit end may indicate a condition that the second transmit end needs to satisfy to transmit data by using the second link, or may be indication information directly indicating whether the second transmit end can transmit data by using the second link.

Optionally, the policy information includes adjustment value indication information for a CCA threshold used by the second transmit end.

For example, in FIG. 1, each BSS in a wireless communications system has a different cell identifier BSS color, and each AP or STA can identify a cell identifier in a currently transmitted signal. After receiving interference from the BSS2, the STA2 (namely, a first receive end) determines an interference level of the interference, and determines a CCA threshold adjustment value corresponding to the interference level, and the STA2 reports the CCA threshold adjustment value to the AP1 (namely, the first transmit end). When the AP1 sends a signal to the STA2, if the CCA threshold adjustment value is carried in the signal that is sent, after detecting the signal sent by the AP1, a station in the BSS2 or an access point (namely, the second transmit end) in the BSS2 adjusts a CCA threshold based on the CCA threshold adjustment value, and determines, based on an adjusted CCA threshold, whether to perform spatial reuse transmission.

For another example, in the example of FIG. 1, the STA2 may use $\Delta H$ to represent a CCA threshold adjustment value that is based on large interference, use $\Delta M$ to represent a CCA threshold adjustment value that is based on medium interference, use $\Delta L$ to represent a CCA threshold adjustment value that is based on small interference. If the STA2 receives not only relatively large interference from the BSS2 but also medium interference from another BSS, a CCA threshold adjustment value reported by the STA2 should be ΔH+ΔM based on the foregoing example.

According to the wireless communication method in this embodiment of the present invention, the second transmit end can adjust the CCA threshold correspondingly based on an interference status change in a network. This increases flexibility of spatial reuse transmission and improves transmission efficiency.

It should be understood that this embodiment of the present invention is not limited thereto. For example, alternatively, the AP1 may serve as the first receive end to determine the CCA threshold adjustment value of the second transmit end and send the CCA threshold adjustment value to the STA2, and the STA2 broadcasts the CCA threshold adjustment value. Therefore, any method that enables the second transmit end to obtain the CCA threshold adjustment value used by the second transmit end falls within the protection scope of the present invention.

Optionally, the policy information includes indication information of a maximum allowed interference value. The maximum allowed interference value is a maximum interference value that is of a signal from the second BSS and that is allowed by the first receive end, and the first receive end is a receive end of the first link.

Still using FIG. 1 as an example, the AP1 (namely, the first transmit end) may determine a maximum allowed interference value of the STA2 (namely, the first receive end), and send the maximum allowed interference value and a cell identifier of the BSS2 out. After detecting indication information of the maximum allowed interference value and the cell identifier of the BSS2 that are from the AP1, a STA5 (namely, the second transmit end) may determine, based on a value relationship between the maximum allowed interference value and a transmit power value used by the STA5 to transmit data by using the second link, whether to perform spatial reuse transmission. If the maximum allowed interference value is greater than or equal to the transmit power value, the STA5 may determine to perform spatial reuse transmission. If the maximum allowed interference value is less than the transmit power value, the STA5 may determine not to perform spatial reuse transmission. In this way, the second transmit end can determine, based on the maximum interference value that is of an interference signal and that is allowed by the first receive end, a condition that needs to be satisfied for performing spatial reuse transmission, and can flexibly determine a spatial reuse transmission policy based on an actual network case.

It should be understood that this embodiment of the present invention is not limited thereto. For example, the second transmit end may alternatively determine, based on a value relationship between a value of actual interference of the second transmit end on the first receive end and the maximum allowed interference value of the first receive end, whether to perform spatial reuse transmission; or the second transmit end determines, based on an adjusted CCA threshold and the maximum interference value of the first receive end, whether to transmit data by using the second link. Therefore, any method that enables the second transmit end to determine, based on the maximum allowed interference value of the first receive end, whether to perform spatial reuse transmission falls within the protection scope of the present invention.

Optionally, the method 200 includes the following operation.

S215. The second transmit end determines a maximum energy value of an interference signal, where the interference signal is a signal from the first BSS that is received by the second transmit end.

That the second transmit end determines, based on the policy information, whether to transmit data by using the second link includes:

the second transmit end determines, based on a value relationship between the maximum allowed interference value and the maximum energy value of the interference signal, whether to transmit data by using the second link.

In the IEEE 802.11ax specification, an AP and a STA have equal transmit power. Therefore, a maximum energy value of an interference signal received by the second transmit end from the first BSS is equal to a maximum energy value of an interference signal from the second BSS that is received by the first receive end. For example, in FIG. 1, an interference signal with a maximum energy value received from the BSS2 by the STA2 used as the first transmit end is a signal sent by the STA5; an interference signal with a maximum energy value received from the BSS1 by the STA5 used as the second transmit end is a signal sent by the STA2. Therefore, the second transmit end can determine, based on a value relationship between the maximum allowed interference value of the first receive end and the maximum energy value of the interference signal received by the second transmit end from the first BSS, whether to transmit data by using the second link. In this way, the second transmit end can determine, based on the maximum allowed interference value and a maximum value of interference of a current signal from the first BSS on the second transmit end, whether to perform spatial reuse transmission.

It should be understood that this embodiment of the present invention is not limited thereto. For example, the second transmit end may alternatively determine, based on the adjusted CCA threshold and the value relationship between the maximum allowed interference value and the maximum energy value of the interference signal, whether to transmit data by using the second link. Therefore, any method that enables the second transmit end to determine, based on the maximum energy value of the interference signal from the first BSS, whether to perform spatial reuse transmission falls within the protection scope of the present invention.

Optionally, the policy information further includes first indication information and second indication information. The first indication information is used to indicate that the first link is a downlink transmission link, and the second indication information is used to indicate whether the second transmit end is allowed to transmit data by using the second link.

That the second transmit end determines, based on the policy information, whether to transmit data by using the second link includes:

the second transmit end determines, based on the first indication information and the second indication information, whether to transmit data by using the second link.

If the first link is a downlink, there may be a plurality of receive ends in the first BSS; if the first link is an uplink, there is only one receive end in the first BSS. Therefore, when the first link is a downlink, the first receive end is more likely to receive interference. For example, in FIG. 1, the STA5 serving as the second transmit end in the BSS2 generates largest interference on the STA2 serving as a receive end. Therefore, after receiving indication information indicating that the STA5 is allowed to perform spatial reuse transmission, the STA5 may determine, based on the first indication information, to perform spatial reuse transmission by using the second downlink. This can reduce interference on the first link and improve robustness of spatial reuse transmission.

It should be understood that this embodiment of the present invention is not limited thereto. Any method that enables the second transmit end to determine an uplink or downlink state of the first link and any method used to indicate whether the second transmit end can transmit data by using the second link fall within the protection scope of the present invention.

Optionally, the policy information is carried in a data packet transmitted by using the first link.

For example, a CCA threshold adjustment value reported by the first receive end may be indicated by using three bits; a CCA threshold adjustment value transmitted in a data packet by the first transmit end may be indicated by using six bits; whether the second transmit end is allowed to perform spatial reuse transmission may be indicated by using one bit; that the first link is a downlink may be indicated by using one bit; a cell identifier of the second BSS may be indicated by using six bits; a maximum allowed interference value may be indicated by using five bits; and a maximum interference value of a signal may be indicated by using five bits. All the foregoing bits may be included in a data packet transmitted by using the first link, so that the policy information can be transmitted in an existing data packet. This saves transmission resources, and improves network transmission efficiency.

It should be understood that this embodiment of the present invention is not limited thereto. Any method that can be used to indicate the foregoing information falls within the protection scope of the present invention.

Therefore, according to the wireless communication method in this embodiment of the present invention, by receiving the policy information sent by the first transmit end, the second transmit end can dynamically adjust a spatial reuse transmission policy based on an actual situation of a current network. This improves a system throughput.

The foregoing describes the wireless communication method in this embodiment of the present invention with reference to FIG. 2 from the perspective of the second transmit end. The following describes in detail a wireless communication method in an embodiment of the present invention with reference to FIG. 3 from the perspective of a first transmit end.

FIG. 3 is a schematic flowchart 300 of a wireless communication method according to an embodiment of the present invention that is described from the perspective of the first transmit end. As shown in FIG. 3, the method 300 includes the following operations.

S310. The first transmit end determines policy information, where the first transmit end is a transmit end that is in a first BSS and that transmits data by using a first link, the policy information is used to indicate a condition that a second transmit end needs to satisfy to transmit data by using a second link, or used to indicate whether a second transmit end is allowed to transmit data by using the second link, the second transmit end belongs to a second BSS, time domain resources corresponding to the second link are partially the same as time domain resources corresponding to the first link, and frequency domain resources corresponding to the second link are partially or completely the same as frequency domain resources corresponding to the first link.

S320. The first transmit end sends the policy information.

According to the wireless communication method in this embodiment of the present invention, a spatial reuse transmission policy can be adjusted dynamically based on an actual situation of a current network. This improves a system throughput.

In S310, the first transmit end may be an AP, or may be a STA; the policy information determined by the first transmit end may indicate a condition that the second transmit end needs to satisfy to transmit data by using the second link, or may be indication information directly indicating whether the second transmit end can transmit data by using the second link.

Optionally, the policy information includes adjustment value indication information for a CCA threshold used by the second transmit end.

That a first transmit end determines policy information includes the following operations.

S301. The first transmit end receives the adjustment value indication information sent by a receive end of the first link.

S311. The first transmit end determines the adjustment value indication information as the policy information.

For example, in FIG. 1, each BSS in a wireless communications system has a different cell identifier BSS color, and each AP or STA can identify a cell identifier in a currently transmitted signal. After receiving interference from the BSS2, the STA2 (namely, a first receive end) determines an interference level of the interference, and determines a CCA threshold adjustment value corresponding to the interference level, and the STA2 reports the CCA threshold adjustment value to the AP1 (namely, the first transmit end). The AP1 determines information about the CCA threshold adjustment value as policy information, and sends the policy information to a station in the BSS2 or an access point (namely, the second transmit end) in the BSS2, so that the second transmit end adjusts a CCA threshold based on the CCA threshold adjustment value, and determines, based on an adjusted CCA threshold, whether to perform spatial reuse transmission.

For another example, in the example of FIG. 1, the STA2 may use $\Delta H$ to represent a CCA threshold adjustment value that is based on large interference, use $\Delta M$ to represent a CCA threshold adjustment value that is based on medium interference, use $\Delta L$ to represent a CCA threshold adjustment value that is based on small interference. If the STA2 receives not only relatively large interference from the BSS2 but also medium interference from another BSS, a CCA threshold adjustment value reported by the STA2 should be $\Delta H+\Delta M$ based on the foregoing example. Therefore, according to the wireless communication method in this embodiment of the present invention, the second transmit end can adjust the CCA threshold correspondingly based on an interference status change in a network. This increases flexibility of spatial reuse transmission and improves transmission efficiency.

It should be understood that this embodiment of the present invention is not limited thereto. For example, alternatively, the AP1 may serve as the first receive end to determine the CCA threshold adjustment value of the second transmit end and send the CCA threshold adjustment value to the STA2, and the STA2 broadcasts the CCA threshold adjustment value. Therefore, any method that can be used to determine the CCA threshold adjustment value used by the second transmit end falls within the protection scope of the present invention.

Optionally, the policy information includes indication information of a maximum allowed interference value. The maximum allowed interference value is a maximum interference value that is of a signal from the second BSS and that is allowed by the receive end of the first link.

Still using FIG. 1 as an example, the AP1 (namely, the first transmit end) may determine a maximum allowed interference value of the STA2 (namely, the first receive end). The maximum allowed interference value is merely related to a transmission characteristic of the first link, and is irrelevant to an interference signal. When the AP1 or the STA2 detects that the interference signal is from the BSS2, the AP1 may send the maximum allowed interference value and a cell identifier of the BSS2 out. After detecting indication information of the maximum allowed interference value and the cell identifier of the second BSS that are from the AP1, the STA5 (namely, the second transmit end) may determine, based on a value relationship between the maximum allowed interference value and a transmit power value used by the STA5 to transmit data by using the second link, whether to perform spatial reuse transmission. In this way, the second transmit end can determine, based on the maximum interference value that is of the interference signal and that is allowed by the first receive end, a condition that needs to be satisfied for performing spatial reuse transmission, and can flexibly determine a spatial reuse transmission policy based on an actual network case.

It should be understood that this embodiment of the present invention is not limited thereto. For example, the cell identifier of the second BSS and the indication information of the maximum allowed interference value may be sent out together. If the second transmit end receives the foregoing information, the second transmit end performs corresponding processing. If a transmit end in another BSS receives the foregoing information, the transmit end may not perform corresponding processing. For another example, the CCA threshold adjustment value, the maximum allowed interference value, and the cell identifier of the second BSS may alternatively be sent out together. The second transmit end determines, based on an adjusted CCA threshold and the maximum allowed interference value of the first receive end, whether to perform spatial reuse transmission by using the second link. Therefore, any method that enables the second transmit end to determine, based on the maximum allowed interference value of the first receive end, whether to perform spatial reuse transmission falls within the protection scope of the present invention.

Optionally, the method 300 includes the following operation.

S302. The first transmit end receives maximum interference value information, where the maximum interference value information is used to indicate a maximum energy value of an interference signal from the second BSS that is received by the receive end of the first link.

That a first transmit end determines policy information includes:
  the first transmit end determines second indication information based on a value relationship between the maximum energy value of the interference signal and the maximum allowed interference value. The second indication information is used to indicate whether the second transmit end is allowed to transmit data by using the second link, and the maximum allowed interference value is a maximum interference value that is of the signal from the second BSS and that is allowed by the receive end of the first link.

In S302, using FIG. 1 as an example, the STA2 serving as the first receive end reports maximum interference value information after receiving interference. If the AP2 transmits a signal, the STA2 may measure that an interference value of an input signal is −60 dBm, and report the interference value to the AP1; then, if the STA5 transmits a signal, the STA2 measures that an interference value of an input signal is −50 dBm, which is greater than the value previously measured, and the station reports the updated interference value (−50 dBm) to the AP1. If the STA2 further receives interference from a signal of another BSS, and an interference value of the signal is greater than the interference value of the signal from the STA5, the STA2 reports the interference value of the signal to the AP1.

After receiving the maximum interference value reported by the STA2, the AP1 determines, based on a value relationship between the maximum interference value and a maximum allowed interference value of the STA2 (that is, a maximum interference value allowed for normally transmitting data by the STA2), indication information indicating whether a transmit end in another BSS can perform spatial reuse transmission. If the maximum interference value is less than the maximum allowed interference value, the AP1 sends indication information indicating that the transmit end in the another BSS is allowed to perform spatial reuse transmission. If the maximum interference value is greater than the maximum allowed interference value, the AP1 sends indication information indicating that the transmit end in the another BSS is not allowed to perform spatial reuse transmission.

Therefore, in this embodiment of the present invention, by comparing the maximum value of interference on the first receive end and the maximum allowed interference value of the first receive end, indication information indicating whether the second transmit end is allowed to perform spatial reuse transmission can be determined. In this way, a spatial reuse transmission policy can be flexibly determined based on an actual network case.

It should be understood that this embodiment of the present invention is not limited thereto. Any method for determining the spatial reuse transmission policy based on the maximum value of the current interference on the first receive end and the maximum allowed interference value of the first receive end falls within the protection scope of the present invention.

Optionally, the policy information further includes first indication information. The first indication information is used to indicate that the first link is a downlink transmission link, so that the second transmit end determines, based on the first indication information and the second indication information, whether to transmit data by using the second link.

If the first link is a downlink, there may be a plurality of receive ends in the first BSS; if the first link is an uplink, there is only one receive end in the first BSS. Therefore, when the first link is a downlink, the first receive end is more likely to receive interference. For example, in FIG. 1, the STA5 serving as the second transmit end in the BSS2 generates largest interference on the STA2 serving as a receive end. Therefore, when the first link is a downlink, the AP1 adds, to a data packet that is sent by the AP1, first indication information indicating that current transmission is downlink transmission, so that after receiving indication information indicating that the STA5 is allowed to perform spatial reuse transmission, the STA5 can determine, based on the first indication information, that spatial reuse transmission can be performed by using the second downlink. This can reduce interference on the first link and improve robustness of spatial reuse transmission.

It should be understood that this embodiment of the present invention is not limited thereto. Any method that enables the second transmit end to determine an uplink or downlink state of the first link and any method used to indicate whether the second transmit end can transmit data by using the second link fall within the protection scope of the present invention.

Optionally, the first transmit end determines, based on an energy value P of an input signal of the receive end of the first link and a lowest signal-to-noise ratio (SNRcurr) required for transmitting information by using the first link, a maximum allowed interference value (PImax) of the receive end of the first link. The input signal is a signal of the first transmit end that is received by the receive end of the first link.

The maximum allowed interference value may be determined based on the formula PImax=P−SNRcurr. However, this embodiment of the present invention is not limited thereto. The maximum allowed interference value may alternatively be determined in another manner.

Optionally, the first transmit end further determines the maximum allowed interference value of the receive end of the first link based on a margin. The margin is used to improve robustness of spatial reuse transmission.

The maximum allowed interference value may be determined based on the formula PImax=P−SNRcurr−Margin. However, this embodiment of the present invention is not limited thereto. The maximum allowed interference value may alternatively be determined in another manner.

Optionally, the first transmit end further determines the maximum allowed interference value of the receive end of the first link based on a depth gap value. The depth gap value is a difference between a first interference value and a second interference value, the first interference value is an energy value of a signal from the second BSS that is received by the receive end of the first link, and the second interference value is an energy value of a signal from the second BSS that is received by a device, in the first BSS, nearest to the second BSS.

For example, in FIG. 1, the AP1 (namely, the first transmit end) calculates a difference between different maximum interference values, from a same neighboring cell, reported by each station. For example, an interference value of a signal of the BSS2 that is received by the STA2 is −50 dBm, and an interference value of a signal of the BSS2 that is received by the STA5 (namely, the receive end of the first link) is −60 dBm. Therefore, a difference 10 dBm between the two interference values represents a depth gap (DG) of the STA5. To be specific, for an interference signal from a same BSS, the maximum allowed interference value of the STA5 is greater than the maximum allowed interference value of the STA2 by 10 dBm.

The maximum allowed interference value of the STA5 may be determined based on the formula PImax=P−SNRcurr−Margin+DG. Therefore, in this embodiment of the present invention, when the transmit end in the first BSS is unclear of a specific location of a transmit end in the second BSS, the transmit end in the first BSS may obtain the maximum allowed interference value of the receive end of the first link based on an actual interference status. However, this embodiment of the present invention is not limited thereto. The maximum allowed interference value may alternatively be determined in another manner.

Optionally, the policy information in the method 300 is carried in a data packet transmitted by using the first link.

For example, in a data packet transmitted by using the first link, the first transmit end may use one bit to indicate that the second transmit end needs to adjust a CCA threshold of the second transmit end, may use six bits to indicate a CCA threshold adjustment value. For another example, in a data packet transmitted by using the first link, the first receive end may use five bits to indicate an interference level of interference on the first receive end; in a data packet transmitted by using the first link, the first transmit end may use one bit to indicate whether the second transmit end is allowed to perform spatial reuse transmission, and further use one bit to indicate that the first link is a downlink. For another example, in a data packet transmitted by using the first link, the first receive end may use six bits to indicate a cell identifier of the second BSS, and use five bits to indicate an interference level of interference on the first receive end; in a data packet transmitted by using the first link, the first transmit end may use six bits to indicate the cell identifier of the second BSS, and use five bits to indicate a maximum allowed value of interference of a signal of the second transmit end on the first receive end.

According to this embodiment of the present invention, the policy information can be transmitted in an existing data packet. This saves transmission resources, and improves network transmission efficiency.

It should be understood that this embodiment of the present invention is not limited thereto. Any method that can be used to indicate the foregoing information falls within the protection scope of the present invention.

Therefore, according to the wireless communication method in this embodiment of the present invention, by using the policy information sent by the first transmit end, the second transmit end can dynamically adjust a spatial reuse transmission policy based on an actual situation of a current network. This improves a system throughput.

The foregoing describes the wireless communication method in this embodiment of the present invention with reference to FIG. 3 from the perspective of the first transmit end. The following describes in detail a wireless communication method in an embodiment of the present invention with reference to FIG. 4 from the perspective of a first receive end.

FIG. 4 is a schematic flowchart 400 of a wireless communication method according to an embodiment of the present invention that is described from the perspective of the first receive end. As shown in FIG. 4, the method 400 includes the following operations.

S410. The first receive end determines policy information, where the first receive end is a receive end that is in a first BSS and that transmits data by using a first link, the policy information is used to indicate a condition that a second transmit end needs to satisfy to transmit data by using a second link, the second transmit end belongs to a second BSS, time domain resources corresponding to the second link are partially the same as time domain resources corresponding to the first link, and frequency domain resources corresponding to the second link are partially or completely the same as frequency domain resources corresponding to the first link.

S420. The first receive end sends the policy information to a first transmit end, where the first transmit end is a transmit end of the first link.

According to the wireless communication method in this embodiment of the present invention, a spatial reuse transmission policy can be adjusted dynamically based on an actual situation of a current network. This improves a system throughput.

Optionally, the policy information includes adjustment value indication information for a CCA threshold used by the second transmit end.

In the method 400, the first receive end may be an AP, or may be a STA. For example, in FIG. 1, each BSS in a wireless communications system has a different cell identifier BSS color, and each AP or STA can identify a cell identifier in a currently transmitted signal. After receiving interference from the BSS2, the STA2 (namely, the first receive end) determines an interference level of the interference, and determines a CCA threshold adjustment value corresponding to the interference level, and the STA2 reports the CCA threshold adjustment value to the AP1 (namely, the first transmit end). The AP1 determines information about the CCA threshold adjustment value as policy information, and sends the policy information to a station in the BSS2 or an access point (namely, the second transmit end) in the BSS2, so that the second transmit end adjusts a CCA threshold based on the CCA threshold adjustment value, and determines, based on an adjusted CCA threshold, whether to perform spatial reuse transmission.

For another example, in the example of FIG. 1, the STA2 may use ΔH to represent a CCA threshold adjustment value that is based on large interference, use ΔM to represent a CCA threshold adjustment value that is based on medium interference, use ΔL to represent a CCA threshold adjustment value that is based on small interference. If the STA2 receives not only relatively large interference from the BSS2 but also medium interference from another BSS, a CCA threshold adjustment value reported by the STA2 should be ΔH+ΔM based on the foregoing example. Therefore, according to the wireless communication method in this embodiment of the present invention, the second transmit end can adjust the CCA threshold correspondingly based on an interference status change in a network. This increases flexibility of spatial reuse transmission and improves transmission efficiency.

It should be understood that this embodiment of the present invention is not limited thereto. For example, alternatively, the AP1 may serve as the first receive end to determine the CCA threshold adjustment value of the second transmit end and send the CCA threshold adjustment value to the STA2, and the STA2 broadcasts the CCA threshold adjustment value. Therefore, any method that can be used to determine the CCA threshold adjustment value used by the second transmit end falls within the protection scope of the present invention.

Optionally, the policy information in the method 400 is carried in a data packet transmitted by using the first link.

For example, a CCA threshold adjustment value reported by the first receive end may be indicated by using three bits, and the bits indicating the CCA threshold adjustment value are included in a data packet transmitted by using the first link, so that the policy information can be transmitted in an existing data packet. This saves transmission resources, and improves network transmission efficiency.

It should be understood that this embodiment of the present invention is not limited thereto. Any method that can be used to indicate the foregoing information falls within the protection scope of the present invention.

Therefore, according to the wireless communication method in this embodiment of the present invention, adjustment value indication information of the CCA threshold used by the second transmit end is sent to the first transmit end, so that the second transmit end can dynamically adjust a spatial reuse transmission policy based on an actual situation of a current network. This improves a system throughput.

The foregoing describes in detail the wireless communication method in the embodiments of the present invention with reference to FIG. 1 to FIG. 4. The following describes wireless communications apparatuses in embodiments of the present invention with reference to FIG. 5 to FIG. 7.

Figure 5:
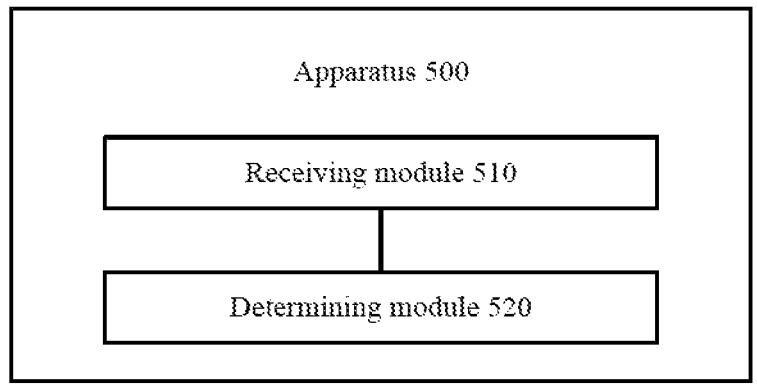
FIG. 5 is a schematic block diagram of a wireless communications apparatus according to an embodiment of the present invention.

FIG. 5 is a schematic block diagram of a wireless communications apparatus 500 according to an embodiment of the present invention. As shown in FIG. 5, the apparatus 500 includes:

a receiving module 510, configured to receive policy information sent by a first transmit end, where the first transmit end is a transmit end that is in a first BSS and that transmits data by using a first link, the policy information is used to indicate a condition that a second transmit end needs to satisfy to transmit data by using a second link, or used to indicate whether the second transmit end is allowed to transmit data by using a second link, the second transmit end belongs to a second BSS, time domain resources corresponding to the second link are partially the same as time domain resources corresponding to the first link, and frequency domain resources corresponding to the second link are partially or completely the same as frequency domain resources corresponding to the first link; and a determining module 520, configured to determine, based on the policy information received by the receiving module 510, whether to transmit data by using the second link.

Optionally, the policy information includes adjustment value indication information for a CCA threshold used by the second transmit end. Therefore, the second transmit end can adjust the CCA threshold correspondingly based on an interference status change in a network. This improves transmission efficiency.

Optionally, the policy information includes indication information of a maximum allowed interference value. The maximum allowed interference value is a maximum interference value that is of a signal from the second BSS and that is allowed by a first receive end, and the first receive end is a receive end of the first link. Therefore, the second transmit end can determine, based on the maximum interference value that is of the signal from the second BSS and that is allowed by the first receive end, a condition that needs to be satisfied for performing spatial reuse transmission.

Optionally, the determining module 520 includes:

a first determining unit 521, configured to determine a maximum energy value of an interference signal, where the interference signal is a signal from the first BSS that is received by the second transmit end; and a second determining unit 522, configured to determine, based on a value relationship between the maximum allowed interference value and the maximum energy value of the interference signal, whether to transmit data by using the second link.

Therefore, the second transmit end can determine, based on the maximum allowed interference value and a maximum value of interference of the signal from the first BSS on the second transmit end, the condition that needs to be satisfied for performing spatial reuse transmission.

Optionally, the policy information includes first indication information and second indication information, the first indication information is used to indicate that the first link is a downlink transmission link, and the second indication information is used to indicate whether the second transmit end is allowed to transmit data by using the second link; and the determining module 520 is configured to determine, based on the first indication information and the second indication information, whether to transmit data by using the second link. This can improve network transmission efficiency.

Optionally, the policy information is carried in a data packet transmitted by using the first link, so that the policy information can be transmitted in an existing data packet. This saves transmission resources, and improves network transmission efficiency.

The wireless communications apparatus 500 according to this embodiment of the present invention may correspond to the second transmit end in the wireless communication method 200 according to the embodiment of the present invention, and the foregoing operations and/or functions of each module in the apparatus 500 are intended to implement corresponding procedures of the method in FIG. 2. For brevity, the details are not repeated herein.

Therefore, by receiving the policy information sent by the first transmit end, the wireless communications apparatus according to this embodiment of the present invention can dynamically adjust a spatial reuse transmission policy based on an actual situation of a current network. This improves a system throughput.

Figure 6:
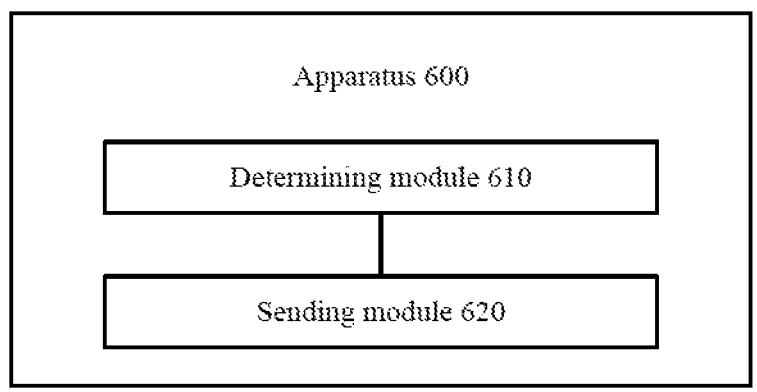
FIG. 6 is a schematic block diagram of a wireless communications apparatus according to another embodiment of the present invention.

FIG. 6 is a schematic block diagram of a wireless communications apparatus 600 according to an embodiment of the present invention. As shown in FIG. 6, the apparatus 600 includes:
- a determining module 610, configured to determine policy information, where the apparatus is a transmit apparatus that is in a first BSS and that transmits data by using a first link, the policy information is used to indicate a condition that a second transmit end needs to satisfy to transmit data by using a second link, or used to indicate whether the second transmit end is allowed to transmit data by using a second link, the second transmit end belongs to a second BSS, time domain resources corresponding to the second link are partially the same as time domain resources corresponding to the first link, and frequency domain resources corresponding to the second link are partially or completely the same as frequency domain resources corresponding to the first link; and
- a sending module 620, configured to send the policy information determined by the determining module.

Optionally, the apparatus 600 includes a first receiving module 630, configured to receive adjustment value indication information for a CCA threshold used by the second transmit end that is sent by a receive end of the first link; and the determining module 610 is configured to determine the adjustment value indication information as the policy information. In this way, the second transmit end can adjust the CCA threshold correspondingly based on an interference status change in a network. This improves transmission efficiency.

Optionally, the policy information includes indication information of a maximum allowed interference value. The maximum allowed interference value is a maximum interference value that is of a signal from the second BSS and that is allowed by the receive end of the first link. Therefore, the second transmit end can determine, based on the maximum allowed interference value, a condition that needs to be satisfied for performing spatial reuse transmission.

Optionally, the apparatus 600 includes: a second receiving module 640, configured to receive maximum interference value information. The maximum interference value information is used to indicate a maximum energy value of an interference signal from the second BSS that is received by the receive end of the first link. The determining module 610 is configured to determine second indication information based on a value relationship between the maximum energy value of the interference signal and the maximum allowed interference value. The second indication information is used to indicate whether the second transmit end is allowed to transmit data by using the second link, and the maximum allowed interference value is a maximum interference value that is of the signal from the second BSS and that is allowed by the receive end of the first link. In this way, the second transmit end can determine, based on the second indication information, whether to perform spatial reuse transmission.

Optionally, the policy information further includes first indication information. The first indication information is used to indicate that the first link is a downlink transmission link, so that the second transmit end determines, based on the first indication information and the second indication information, whether to transmit data by using the second link.

Optionally, the determining module 610 is configured to determine the maximum allowed interference value based on an energy value of an input signal of the receive end of the first link and a lowest signal-to-noise ratio required for transmitting information by using the first link. The input signal is a signal of a transmit end of the first link that is received by the receive end of the first link.

Optionally, the determining module 610 is further configured to determine the maximum allowed interference value based on a margin. The margin is used to improve robustness of spatial reuse transmission.

Optionally, the determining module 610 is further configured to determine the maximum allowed interference value of the receive end of the first link based on a depth gap value. The depth gap value is a difference between a first interference value and a second interference value, the first interference value is an energy value of a signal from the second BSS that is received by the receive end of the first link, and the second interference value is an energy value of a signal from the second BSS that is received by a device, in the first BSS, nearest to the second BSS. In this way, when the first BSS is unclear of a specific location of the second BSS, the first BSS can obtain the maximum allowed interference value of the receive end of the first link based on an actual interference status.

Optionally, the policy information is carried in a data packet transmitted by using the first link, so that the policy information can be transmitted in an existing data packet. This saves transmission resources, and improves network transmission efficiency.

The wireless communications apparatus 600 according to this embodiment of the present invention may correspond to the first transmit end in the wireless communication method 300 according to the embodiment of the present invention, and the foregoing operations and/or functions of each module in the apparatus 600 are intended to implement corresponding procedures of the method in FIG. 3. For brevity, the details are not repeated herein.

Therefore, the wireless communications apparatus according to this embodiment of the present invention receives interference status information sent by the first receive end, to determine a spatial reuse transmission policy, or determines a spatial reuse transmission policy directly based on the maximum allowed interference value of the first receive end, so that the second transmit end can dynamically adjust the spatial reuse transmission policy based on an actual situation of a current network. This improves a system throughput.

Figure 7:
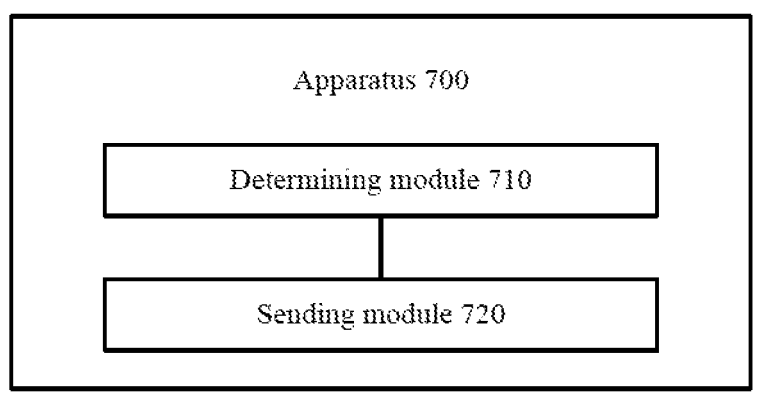
FIG. 7 is a schematic block diagram of a wireless communications apparatus according to still another embodiment of the present invention.

FIG. 7 is a schematic block diagram of a wireless communications apparatus 700 according to an embodiment of the present invention. As shown in FIG. 7, the apparatus 700 includes:

a determining module 710, configured to determine policy information, where the apparatus is a receive apparatus that is in a first BSS and that transmits data by using a first link, the policy information is used to indicate a condition that a second transmit end needs to satisfy to transmit data by using a second link, the second transmit end belongs to a second BSS, time domain resources corresponding to the second link are partially the same as time domain resources corresponding to the first link, and frequency domain resources corresponding to the second link are partially or completely the same as frequency domain resources corresponding to the first link; and a sending module 720, configured to send the policy information determined by the determining module to a first transmit end, where the first transmit end is a transmit end of the first link.

Optionally, the policy information includes adjustment value indication information for a CCA threshold used by the second transmit end. Therefore, the second transmit end can adjust the CCA threshold correspondingly based on an interference status change in a network. This improves transmission efficiency.

Optionally, the policy information is carried in a data packet transmitted by using the first link, so that the policy information can be transmitted in an existing data packet. This improves network transmission efficiency.

The wireless communications apparatus 700 according to this embodiment of the present invention may correspond to the first receive end in the wireless communication method 400 according to the embodiment of the present invention, and the foregoing operations and/or functions of each module in the apparatus 700 are intended to implement corresponding procedures of the method in FIG. 4. For brevity, the details are not repeated herein.

Therefore, the wireless communications apparatus according to this embodiment of the present invention sends, to the first transmit end, the adjustment value indication information for the CCA threshold used by the second transmit end, so that the second transmit end can dynamically adjust a spatial reuse transmission policy based on an actual situation of a current network. This improves a system throughput.

The foregoing describes in detail the wireless communication method and apparatus in the embodiments of the present invention with reference to FIG. 1 to FIG. 7. The following describes in detail a wireless communications device in an embodiment of the present invention with reference to FIG. 8.

Figure 8:
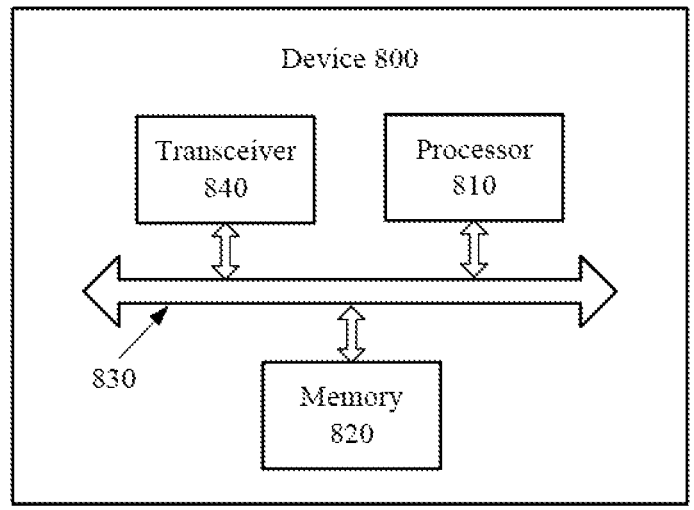
FIG. 8 is a schematic structural diagram of a wireless communications device according to an embodiment of the present invention.

FIG. 8 is a schematic block diagram of a wireless communications device according to an embodiment of the present invention. As shown in FIG. 8, the device 800 includes a processor 810, a memory 820, a bus system 830, and a transceiver 840. The processor 810, the memory 820, and the transceiver 840 are connected by using the bus system 830. The memory 820 is configured to store an instruction. The processor 810 is configured to execute the instruction stored in the memory 820, so as to control the transceiver 840 to send or receive a signal.

The transceiver 840 is configured to receive information, sent by a first transmit end, about a condition that needs to be satisfied for performing spatial reuse transmission, or indication information indicating whether the device is allowed to perform spatial reuse transmission. The processor 810 is configured to perform processing based on the foregoing information received by the transceiver 840, and determine whether to transmit data by using a second link.

Therefore, the wireless communications device 800 according to this embodiment of the present invention receives policy information sent by the first transmit end, so as to dynamically adjust a spatial reuse transmission policy based on an actual situation of a current network. This improves a system throughput.

It should be understood that in this embodiment of the present invention, the processor 810 may be a central processing unit (CPU), or the processor 810 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor, or the processor may also be any conventional processor or the like.

The memory 820 may include a read-only memory and a random access memory, and provide instructions and data for the processor 810. A part of the memory 820 may further include a non-volatile random access memory. For example, the memory 820 may further store device type information.

The bus system 830 may include a data bus, and may further include a power supply bus, a control bus, a status signal bus, and the like. However, for clear description, various buses are represented by the bus system 830 in the figure.

In an implementation process, the operations of the foregoing method may be completed by an integrated logic circuit of hardware in the processor 810, or by a software instruction. The operations of the method disclosed with reference to the embodiments of the present invention may be directly completed by a hardware processor, or may be completed by a combination of hardware in a processor and a software module. The software module may be in a random access memory, a flash memory, a read-only memory, a programmable read-only memory or an erasable programmable memory, a register, or another mature storage medium in the art. The storage medium is in the memory 820, and the processor 810 reads information in the memory 820 and completes the operations of the foregoing method in combination with the hardware. To avoid repetition, no details are repeated herein.

Optionally, in an implementation, the policy information received by the transceiver 840 includes adjustment value indication information for a CCA threshold used by a second transmit end. Therefore, the device 800 can adjust the CCA threshold correspondingly based on an interference status change in a network. This improves transmission efficiency.

Optionally, in an implementation, the policy information received by the transceiver 840 includes indication information of a maximum allowed interference value. The maximum allowed interference value is a maximum interference value that is of a signal from a second BSS and that is allowed by a first receive end, and the first receive end is a receive end of a first link. Therefore, the device 800 can determine, based on the maximum interference value that is of the signal from the second BSS and that is allowed by the first receive end, the condition that needs to be satisfied for performing spatial reuse transmission, so as to flexibly determine a spatial reuse transmission policy based on an actual network case.

Optionally, in an implementation, the processor 810 determines a maximum energy value of an interference signal. The interference signal is a signal from a first BSS that is received by the transceiver 840. The processor 810 is configured to determine, based on a value relationship between the maximum allowed interference value and the maximum energy value of the interference signal, whether to transmit data by using a second link. In this way, the device 800 can determine, based on the maximum allowed interference value and a maximum value of interference of a current signal from the first BSS on the second transmit end, whether to perform spatial reuse transmission.

Optionally, in an implementation, the policy information received by the transceiver 840 includes first indication information and second indication information. The first indication information is used to indicate that the first link is a downlink transmission link, and the second indication information is used to indicate whether the second transmit end is allowed to transmit data by using the second link. The processor 810 is configured to determine, based on the first indication information and the second indication information, whether to transmit data by using the second link. This can reduce interference on the first link and improve robustness of spatial reuse transmission.

Optionally, in an implementation, the policy information received by the transceiver 840 is carried in a data packet transmitted by using the first link, so that the policy information can be transmitted in an existing data packet. This saves transmission resources, and improves network transmission efficiency.

The wireless communications device 800 according to this embodiment of the present invention may correspond to the transmit end device in the method 200 according to the embodiment of the present invention, and the foregoing and other operations and/or functions of each module in the wireless communications device 800 in FIG. 8 are intended to implement corresponding procedures of operations of the method 200 in FIG. 2. For brevity, the details are not repeated herein.

Therefore, the wireless communications device according to this embodiment of the present invention receives the policy information sent by the first transmit end, so that a spatial reuse transmission policy can be dynamically adjusted based on an actual situation of a current network. This improves a system throughput.

Figure 9:
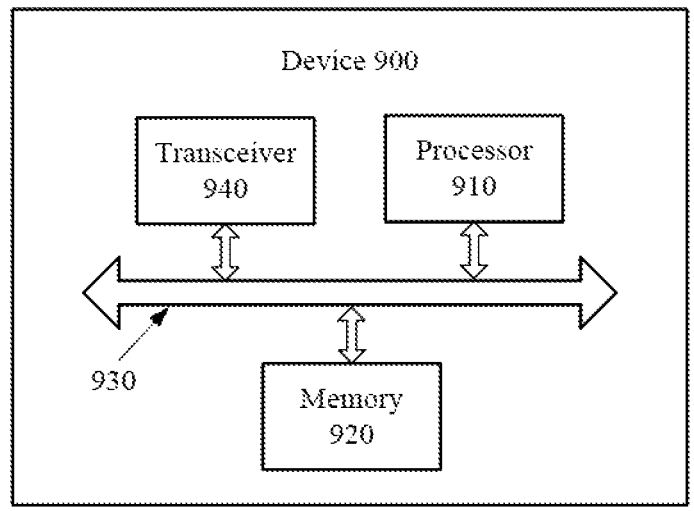
FIG. 9 is a schematic structural diagram of a wireless communications device according to another embodiment of the present invention.

FIG. 9 is a schematic block diagram of a wireless communications device according to an embodiment of the present invention. As shown in FIG. 9, the device 900 includes a processor 910, a memory 920, a bus system 930, and a transceiver 940. The processor 910, the memory 920, and the transceiver 940 are connected by using the bus system 930. The memory 920 is configured to store an instruction. The processor 910 is configured to execute the instruction stored in the memory 920, so as to control the transceiver 940 to send or receive a signal.

The transceiver 940 is configured to receive information, sent by a first receive end, about a condition that needs to be satisfied by a second transmit end for performing spatial reuse transmission, or maximum interference value information of interference on a first receive end, and forward policy information. The processor 910 is configured to perform processing based on the foregoing information received by the transceiver 940 and determine a policy for the second transmit end to perform spatial reuse transmission.

Therefore, the wireless communications device 900 according to this embodiment of the present invention receives the policy information sent by a first transmit end, so as to dynamically adjust a spatial reuse transmission policy based on an actual situation of a current network. This improves a system throughput.

It should be understood that in this embodiment of the present invention, the processor 910 may be a central processing unit (CPU), or the processor 910 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor, or the processor may also be any conventional processor or the like.

The memory 920 may include a read-only memory and a random access memory, and provide instructions and data for the processor 910. A part of the memory 920 may further include a non-volatile random access memory. For example, the memory 920 may further store device type information.

The bus system 930 may include a data bus, and may further include a power supply bus, a control bus, a status signal bus, and the like. However, for clear description, various buses are represented by the bus system 930 in the figure.

In an implementation process, the operations of the foregoing method may be completed by an integrated logic circuit of hardware in the processor 910, or by a software instruction. The operations of the method disclosed with reference to the embodiments of the present invention may be directly completed by a hardware processor, or may be completed by a combination of hardware in a processor and a software module. The software module may be in a random access memory, a flash memory, a read-only memory, a programmable read-only memory or an erasable programmable memory, a register, or another mature storage medium in the art. The storage medium is in the memory 920, and the processor 910 reads information in the memory 920 and completes the operations of the foregoing method in combination with the hardware. To avoid repetition, no details are repeated herein.

Optionally, in an embodiment, the transceiver 940 receives adjustment value information that is sent by a receive end of a first link for a CCA threshold used by the second transmit end; and the processor 910 determines the adjustment value information as the policy information. In this way, the second transmit end can adjust the CCA threshold correspondingly based on an interference status change in a network. This improves transmission efficiency.

Optionally, in an embodiment, the policy information determined by the processor 910 includes indication information of a maximum allowed interference value. The maximum allowed interference value is a maximum interference value that is of a signal from a second BSS and that is allowed by the receive end of the first link, so that the second transmit end can determine, based on the maximum allowed interference value, the condition that needs to be satisfied for performing spatial reuse transmission, and can flexibly determine a spatial reuse transmission policy based on an actual network case.

Optionally, in an embodiment, the transceiver 940 receives the maximum interference value information sent by the receive end of the first link. The maximum interference value information is used to indicate a maximum energy value of an interference signal from the second BSS that is received by the receive end of the first link. The processor 910 determines second indication information based on a value relationship between the maximum energy value of the interference signal and the maximum allowed interference value. The second indication information is used to indicate whether the second transmit end is allowed to transmit data by using a second link, and the maximum allowed interference value is a maximum interference value that is of the signal from the second BSS and that is allowed by the receive end of the first link. In this way, a spatial reuse transmission policy can be flexibly determined based on an actual network case.

Optionally, in an embodiment, the policy information determined by the processor 910 includes first indication information. The first indication information is used to indicate that the first link is a downlink transmission link, so that the second transmit end determines, based on the first indication information and the second indication information, whether to transmit data by using the second link.

Optionally, in an embodiment, the processor 910 determines a maximum allowed interference value of the receive end of the first link based on an energy value of an input signal of the receive end of the first link and a lowest signal-to-noise ratio required for transmitting information by using the first link. The input signal is a signal of the first transmit end that is received by the receive end of the first link.

Optionally, in an embodiment, the processor 910 further determines the maximum allowed interference value of the receive end of the first link based on a margin. The margin is used to improve robustness of spatial reuse transmission.

Optionally, in an embodiment, the processor 910 further determines the maximum allowed interference value of the receive end of the first link based on a depth gap value. The depth gap value is a difference between a first interference value and a second interference value, the first interference value is an energy value of a signal from the second BSS that is received by the receive end of the first link, and the second interference value is an energy value of a signal from the second BSS that is received by a device, in a first BSS, nearest to the second BSS. In this way, when the first BSS is unclear of a specific location of the second BSS, the first BSS can obtain the maximum allowed interference value of the receive end of the first link based on an actual interference status.

Optionally, in an embodiment, the policy information sent by the transceiver 940 is carried in a data packet transmitted by using the first link, so that the policy information can be transmitted in an existing data packet. This saves transmission resources, and improves network transmission efficiency.

The wireless communications device 900 according to this embodiment of the present invention may correspond to the transmit end device in the method 300 according to the embodiment of the present invention, and the foregoing and other operations and/or functions of each module in the wireless communications device 900 in FIG. 9 are intended to implement corresponding procedures of operations of the method 300 in FIG. 3. For brevity, the details are not repeated herein.

Therefore, the wireless communications device according to this embodiment of the present invention receives interference status information sent by the first receive end, to determine a spatial reuse transmission policy, or determines a spatial reuse transmission policy directly based on the maximum allowed interference value of the first receive end, so that the second transmit end can dynamically adjust the spatial reuse transmission policy based on an actual situation of a current network. This improves a system throughput.

Figure 10:
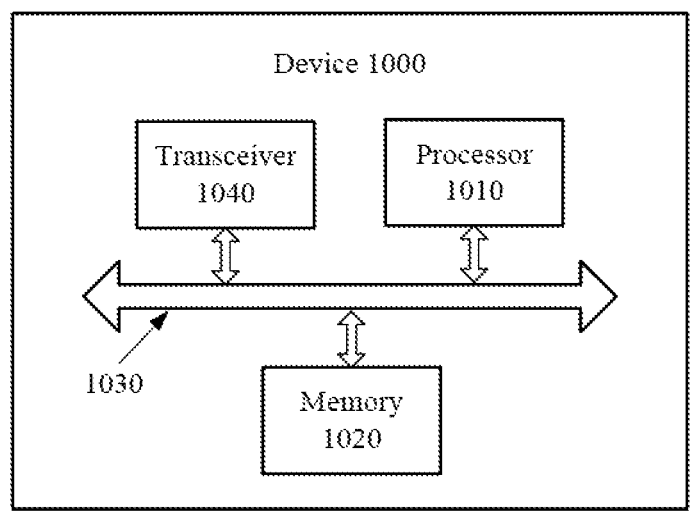
FIG. 10 is a schematic structural diagram of a wireless communications device according to still another embodiment of the present invention.

FIG. 10 is a schematic block diagram of a wireless communications device according to an embodiment of the present invention. As shown in FIG. 10, the device 1000 includes a processor 1010, a memory 1020, a bus system 1030, and a transceiver 1040. The processor 1010, the memory 1020, and the transceiver 1040 are connected by using the bus system 1030, the memory 1020 is configured to store an instruction, and the processor 1010 is configured to execute the instruction stored in the memory 1020, so as to control the transceiver 1040 to send or receive a signal.

The processor 1010 is configured to perform processing based on an interference status of an interference signal received by the transceiver 1040, or determine, based on maximum interference value information of interference on the device 1000, a policy for a second transmit end to perform spatial reuse transmission. The transceiver 1040 is configured to send policy information to a first transmit end.

Therefore, the wireless communications device 1000 according to this embodiment of the present invention sends, to the first transmit end, the policy information or the maximum interference value information of interference on the device 1000, so that the second transmit end can determine, based on an actual situation of a current network, whether to perform spatial reuse transmission. This improves a system throughput.

It should be understood that in this embodiment of the present invention, the processor 1010 may be a central processing unit (CPU), or the processor 1010 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor, or the processor may also be any conventional processor or the like.

The memory 1020 may include a read-only memory and a random access memory, and provide instructions and data for the processor 1010. A part of the memory 1020 may further include a non-volatile random access memory. For example, the memory 1020 may further store device type information.

The bus system 1030 may include a data bus, and may further include a power supply bus, a control bus, a status signal bus, and the like. However, for clear description, various buses are represented by the bus system 1030 in the figure.

In an implementation process, the operations of the foregoing method may be completed by an integrated logic circuit of hardware in the processor 1010, or by a software instruction. The operations of the method disclosed with reference to the embodiments of the present invention may be directly completed by a hardware processor, or may be completed by a combination of hardware in a processor and a software module. The software module may be in a random access memory, a flash memory, a read-only memory, a programmable read-only memory or an erasable programmable memory, a register, or another mature storage medium in the art. The storage medium is in the memory 1020, and the processor 1010 reads information in the memory 1020 and completes the operations of the foregoing method in combination with the hardware. To avoid repetition, no details are repeated herein.

Optionally, in an embodiment, the policy information determined by the processor 1010 includes adjustment value indication information for a CCA threshold used by the second transmit end. Therefore, the second transmit end can adjust the CCA threshold correspondingly based on an interference status change in a network. This improves transmission efficiency.

Optionally, in an embodiment, the policy information sent by the transceiver 1040 is carried in a data packet transmitted by using a first link, so that the policy information can be transmitted in an existing data packet. This improves network transmission efficiency.

The wireless communications device 1000 according to this embodiment of the present invention may correspond to the receive end device in the method 400 according to the embodiment of the present invention, and the foregoing and other operations and/or functions of each module in the wireless communications device 1000 in FIG. 10 are intended to implement corresponding procedures of operations of the method 400 in FIG. 4. For brevity, the details are not repeated herein.

Therefore, the wireless communications device according to this embodiment of the present invention sends, to the first transmit end, the adjustment value indication information for the CCA threshold used by the second transmit end, so that the second transmit end can dynamically adjust a spatial reuse transmission policy based on an actual situation of a current network. This improves a system throughput.

A person of ordinary skill in the art may be aware that, the units and operations in the examples described with reference to the embodiments disclosed herein may be implemented by electronic hardware, computer software, or a combination thereof. To clearly describe the interchangeability between the hardware and the software, the foregoing has generally described compositions and operations of each example based on functions.

Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the operations of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless communication method applied to a wireless local area network, the wireless local area network comprising a first basic service set (BSS) and a second BSS, and a coverage area of the first BSS partially overlaps with a coverage area of the second BSS, the method comprising:
receiving, by a second transmit end, policy information sent by a first transmit end, wherein the second transmit end belongs to the second BSS, the first transmit end is a transmit end that is in the first BSS and transmits data by using a first link, the policy information is used to indicate a condition that the second transmit end needs to satisfy to transmit data by using a second link or the policy information is used to indicate whether the second transmit end is allowed to transmit data by using the second link, wherein, time domain resources corresponding to the second link are partially the same as time domain resources corresponding to the first link, and frequency domain resources corresponding to the second link are partially or completely the same as frequency domain resources corresponding to the first link, wherein, the policy information comprises indication information of a maximum allowed interference value based on a difference between a first interference value and a second interference value, the second interference value being an energy value of a signal from the second BSS that is received by a device nearest to the second BSS in the first BSS; and
determining, by the second transmit end, based on the policy information, whether to perform transmission.

2. The method according to claim 1, wherein, the policy information comprises adjustment value indication information for a clear channel assessment (CCA) threshold used by the second transmit end.

3. The method according to claim 1, wherein, the maximum allowed interference value is a maximum interference value that is of a signal from the second BSS and that is allowed by the receive end of the first link.

4. The method according to claim 1, wherein, the method further comprises:
  determining, by the second transmit end, a maximum energy value of an interference signal, wherein the interference signal is a signal from the first BSS that is received by the second transmit end; and
  the determining, by the second transmit end based on the policy information, whether to perform transmission comprises:
    determining, by the second transmit end based on a value relationship between the maximum allowed interference value and the maximum energy value of the interference signal, whether to transmit data by using the second link.

5. The method according to claim 1, wherein, the policy information comprises first indication information and second indication information, the first indication information is used to indicate that the first link is a downlink transmission link, and the second indication information is used to indicate whether the second transmit end is allowed to transmit data by using the second link; and
  the determining, by the second transmit end, based on the policy information, whether to perform transmission comprises:
    determining, by the second transmit end based on the first indication information and the second indication information indicating whether the second transmit end is allowed to transmit data by using the second link, whether to transmit data by using the second link.

6. The method according to claim 1, wherein, the policy information is carried in a data packet transmitted by using the first link.

7. A wireless communication method applied to a wireless local area network, the wireless local area network comprising a first basic service set (BSS) and a second BSS, and a coverage area of the first BSS partially overlaps with a coverage area of the second BSS, the method comprising:
  determining, by a first transmit end, policy information, wherein the first transmit end is a transmit end that is in the first BSS and transmits data by using a first link, the policy information is used to indicate a condition that a second transmit end needs to satisfy to transmit data by using a second link or the policy information is used to indicate whether a second transmit end is allowed to transmit data by using the second link, the second transmit end belongs to the second BSS, wherein, time domain resources corresponding to the second link are partially the same as time domain resources corresponding to the first link, and frequency domain resources corresponding to the second link are partially or completely the same as frequency domain resources corresponding to the first link, wherein the policy information comprises indication information of a maximum allowed interference value based on a difference between a first interference value and a second interference value, the second interference value being an energy value of a signal from the second BSS that is received by a device nearest to the second BSS in the first BSS; and
  sending, by the first transmit end, the policy information.

8. The method according to claim 7, wherein, the policy information comprises adjustment value indication information for a clear channel assessment (CCA) threshold used by the second transmit end; and
  the determining, by the first transmit end, the policy information comprises:
    receiving, by the first transmit end, the adjustment value indication information sent by a receive end of the first link; and
    determining, by the first transmit end, the adjustment value indication information as the policy information.

9. The method according to claim 7, wherein, the maximum allowed interference value is a maximum interference value that is of a signal from the second BSS and that is allowed by the receive end of the first link.

10. The method according to claim 9, wherein, the method further comprises:
  determining, by the first transmit end, the maximum allowed interference value based on an energy value of an input signal of the receive end of the first link and a lowest signal-to-noise ratio required for transmitting information by using the first link, wherein, the input signal is a signal of the first transmit end that is received by the receive end of the first link.

11. The method according to claim 10, wherein, the first transmit end further determines the maximum allowed interference value of the receive end of the first link based on a depth gap value, wherein the depth gap value is the difference between the first interference value and the second interference value, the first interference value is an energy value of a signal from the second BSS that is received by the receive end of the first link.

12. The method according to claim 7, wherein, the method further comprises:
  receiving, by the first transmit end, maximum interference value information, wherein the maximum interference value information is used to indicate a maximum energy value of an interference signal from the second BSS that is received by a receive end of the first link; and
  the determining, by the first transmit end, the policy information comprises:
    determining, by the first transmit end, second indication information based on a value relationship between the maximum energy value of the interference signal and the maximum allowed interference value, wherein, the second indication information is used to indicate whether the second transmit end is allowed to transmit data by using the second link, and the maximum allowed interference value is a maximum interference value that is of a signal from the second BSS that is allowed by the receive end of the first link.

13. The method according to claim 12, wherein, the policy information further comprises first indication information, wherein the first indication information is used to indicate that the first link is a downlink transmission link, so that the second transmit end determines, based on the first indication information and the second indication information, whether to transmit data by using the second link.

14. The method according to claim 7, wherein, the first transmit end further determines the maximum allowed interference value based on a margin, wherein the margin is used to improve robustness of spatial reuse transmission.

15. The method according to claim 7, wherein, the policy information is carried in a data packet transmitted by using the first link.

16. A wireless communications apparatus configured in a wireless local area network, the wireless local area network comprising a first basic service set (BSS) and a second BSS, and a coverage area of the first BSS partially overlaps with a coverage area of the second BSS, the apparatus comprising:
- a transceiver configured to receive policy information sent by a first transmit end, wherein the first transmit end is a transmit end that is in the first BSS and transmits data by using a first link, the policy information is used to indicate a condition that a second transmit end needs to satisfy to transmit data by using a second link or the policy information is used to indicate whether the second transmit end is allowed to transmit data by using a second link, the second transmit end belonging to the second BSS, wherein, time domain resources corresponding to the second link are partially the same as time domain resources corresponding to the first link, and frequency domain resources corresponding to the second link are partially or completely the same as frequency domain resources corresponding to the first link, wherein the policy information comprises indication information of a maximum allowed interference value based on a difference between a first interference value and a second interference value, the second interference value being an energy value of a signal from the second BSS that is received by a device nearest to the second BSS in the first BSS; and
- a processor configured to determine, based on the policy information received by the transceiver, whether to perform transmission.

17. The apparatus according to claim 16, wherein, the policy information comprises adjustment value indication information for a clear channel assessment (CCA) threshold used by the second transmit end.

18. The apparatus according to claim 16, wherein, the maximum allowed interference value is a maximum interference value that is of a signal from the second BSS and that is allowed by the receive end of the first link.

19. The apparatus according to claim 16, wherein, the processor comprises:
- a first processor configured to determine a maximum energy value of an interference signal, wherein the interference signal is a signal from the first BSS that is received by the second transmit end; and
- a second processor configured to determine, based on a value relationship between the maximum allowed interference value and the maximum energy value of the interference signal, whether to transmit data by using the second link.

20. The apparatus according to claim 16, wherein, the policy information comprises first indication information and second indication information, the first indication information is used to indicate that the first link is a downlink transmission link, and the second indication information is used to indicate whether the second transmit end is allowed to transmit data by using the second link; and
- the processor is further configured to determine, based on the first indication information and the second indication information indicating whether the second transmit end is allowed to transmit data by using the second link, whether to transmit data by using the second link.

* * * * *